US012218741B2

(12) United States Patent
Chakraborty et al.

(10) Patent No.: US 12,218,741 B2
(45) Date of Patent: Feb. 4, 2025

(54) SATELLITE COMMUNICATION WITH DISTRIBUTED GROUND STATIONS USING A MULTI-LEVEL QUEUE

(71) Applicant: Microsoft Technology Licensing, LLC, Redmond, WA (US)

(72) Inventors: Tusher Chakraborty, Bangalore (IN); Nissanka Arachchige Bodhi Priyantha, Redmond, WA (US); Ranveer Chandra, Kirkland, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 463 days.

(21) Appl. No.: 17/714,934

(22) Filed: Apr. 6, 2022

(65) Prior Publication Data

US 2023/0179288 A1 Jun. 8, 2023

(30) Foreign Application Priority Data

Dec. 8, 2021 (IN) .............................. 202141057154

(51) Int. Cl.
*H04B 7/185* (2006.01)
*G06F 3/06* (2006.01)
(Continued)

(52) U.S. Cl.
CPC ......... *H04B 7/18513* (2013.01); *H04B 7/155* (2013.01); *H04B 7/18584* (2013.01)

(58) Field of Classification Search
CPC ................ H04B 7/18513; H04B 7/155; H04B 7/18521; H04B 7/195; H04B 7/18517;
(Continued)

(56) References Cited

U.S. PATENT DOCUMENTS 10,348,395 B2 * 7/2019 Hosotani ............... H04W 72/20
10,523,312 B1 * 12/2019 Tong .................. H04B 7/18513
(Continued)

FOREIGN PATENT DOCUMENTS

WO WO-2021220418 A1 * 11/2021
WO WO-2023091656 A1 * 5/2023 ......... H04B 7/18513

OTHER PUBLICATIONS

Vogelgesang, et al., "Uplink Transmission Probability Functions for LoRa -Based Direct-to-Satellite IoT: A Case Study", In Proceedings of IEEE Global Communications Conference, Dec. 7, 2021, 6 Pages. (Year: 2021).*
(Continued)

*Primary Examiner* — Edan Orgad
*Assistant Examiner* — Vanneilian Lalchinthang
(74) *Attorney, Agent, or Firm* — Barta Jones, PLLC (57) ABSTRACT

The disclosure herein describes using satellites and ground sinks and/or stations for routing IoT device data packets from IoT devices. A target ground sink in range of the satellite is identified and an expected reception (ER) score for the target ground sink is calculated based on ER parameter data and location data of the satellite. A data packet in a first level of a multi-level data structure of the satellite is sent to the target ground sink and, based on an ER threshold exceeding the ER score, the packet is moved to a second level of the multi-level data structure, whereby the data packet is queued to be sent to another ground sink. The disclosure further includes using cell towers as ground sinks and/or using them for backhauling with other ground sinks. The flexibility of the disclosure enables large ground sink networks to be established, reducing latency of packet routing.

20 Claims, 8 Drawing Sheets

(51) Int. Cl.
*G06F 16/215* (2019.01)
*H04B 7/155* (2006.01)
*H04W 84/06* (2009.01)

(58) Field of Classification Search
CPC .............. H04B 7/2041; H04B 7/18519; H04B 7/18576; H04B 7/18584; H04B 7/1856; G06F 16/2365; G06F 16/28; G06F 16/9024; G06F 3/0608; G06F 16/215; G06F 3/0673; G06F 3/0641; G06F 16/1748; G06N 20/00; H04W 84/06
USPC .......................................................... 370/316
See application file for complete search history.

(56) References Cited

U.S. PATENT DOCUMENTS

| | | | | |
|---|---|---|---|---|
| 10,649,676 | B1* | 5/2020 | De Smet | G06F 3/0608 |
| 11,031,999 | B1* | 6/2021 | Liu | H04L 67/61 |
| 11,132,343 | B1* | 9/2021 | Raack | G06F 16/9024 |
| 11,196,623 | B2* | 12/2021 | Smith | H04L 41/0806 |
| 2017/0270038 | A1* | 9/2017 | Ilangovan | G06F 11/302 |
| 2018/0206100 | A1* | 7/2018 | Eisner | H04W 12/02 |
| 2020/0076495 | A1* | 3/2020 | Martinerie | H04L 63/0428 |
| 2021/0011173 | A1* | 1/2021 | Rhee | H04B 7/18589 |
| 2022/0173796 | A1* | 6/2022 | Schloemer | H04B 7/18513 |
| 2023/0082413 | A1* | 3/2023 | Zhang | G01C 11/025 |
| | | | | 702/5 |

OTHER PUBLICATIONS

Fraire, et al., "Direct-To-Satellite IoT—A Survey of the State of the Art and Future Research Perspectives", In Proceedings of International Conference on Ad-Hoc Networks and Wireless, Sep. 25, 2019, pp. 241-258.

"International Search Report and Written Opinion Issued in PCT Application No. PCT/US22/049467", Mailed Date: Feb. 22, 2023, 12 Pages.

Vogelgesang, et al., "Uplink Transmission Probability Functions for LoRa -Based Direct-to-Satellite IoT: A Case Study", In Proceedings of IEEE Global Communications Conference, Dec. 7, 2021, 6 Pages.

* cited by examiner

SATELLITE COMMUNICATION WITH DISTRIBUTED GROUND STATIONS USING A MULTI-LEVEL QUEUE

CROSS-REFERENCE TO RELATED APPLICATION

This application claims the benefit of India Provisional Patent Application serial number 202141057154, filed on Dec. 8, 2021 and entitled "Satellite Communication with Distributed Ground Stations Using a Multi-Level Queue", which is hereby incorporated by reference in its entirety for all intents and purposes.

BACKGROUND

Cube and nanosatellite constellations for Internet of Things (IoT) connectivity are considered the future of IoT. These constellations enable IoT devices on the ground to directly communicate with satellites included in the constellation, which overall is referred to as Direct-to-Satellite (DtS) IoT technology. Satellites utilized in DtS-IoT technology are small in size and cost. Because the nanosatellite directly communicates with the IoT devices, the nanosatellite uses narrow bandwidths for communication. A complete constellation of such satellites can offer constant global coverage.

A DtS-IoT satellite constellation has a large application domain in several industries including agriculture, oil and gas, green energy, forestry, supply chain, and more. Accordingly, a DtS-IoT satellite constellation requires capacity to support up to hundreds of thousands IoT devices on the ground. Existing systems lack the capability to support and manage bandwidth for such a large quantity of IoT devices.

Some existing constellations are not capable of providing near real-time end-to-end (E2E) communication. The average latency of an E2E data packet delivery with existing systems is between one to three hours. In contrast, most of the satellite-based IoT applications such as fleet monitoring, calamities monitoring, maritime, etc., require a latency of less than a minute. The high latency with existing systems is mainly due to the distance that a satellite needs to travel to transmit the data down to ground stations after receiving it up from the IoT devices. For example, ground stations are set up mostly in polar regions or a convenient place in terms of computing infrastructure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for routing IoT device data packets by a satellite is described. A target ground sink in communication range of the satellite is identified and an expected reception (ER) score for the identified target ground sink is calculated based on ER parameter data and location data of the satellite. A data packet in a first level of a multi-level data structure of the satellite is sent to the identified target ground sink and, based on an ER threshold exceeding the calculated ER score, the data packet is moved to a second level of the multi-level data structure, whereby the data packet is queued to be sent subsequently to a second ground sink.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 7, the systems are illustrated as schematic drawings. The drawings may not be to scale.

DETAILED DESCRIPTION

Aspects of the disclosure provide a computerized method and system for enabling the transmission of data from IoT devices to ground stations and/or sinks via satellite communication. The disclosure describes satellites that travel around the Earth, receive uplink data packets from IoT devices on the ground, and sending downlink data packets to ground stations or ground sinks on the ground in other locations. The satellites identify target ground sinks in communication range and calculate expected reception (ER) scores of the ground sinks. The satellites send downlink data packets to the identified ground sinks and, based on the ER scores of the ground sinks (e.g., the ER scores are less than an ER threshold), the satellites move or otherwise transfer, transmit, or store the sent data packets to next levels of one or more multi-level packet data structures, whereby the data packets are queued to be sent to other ground sinks to ensure that they are successfully received by at least one ground sink. The disclosure enables large quantities of low-cost IoT devices and ground stations and/or sinks to be distributed across many different areas and still enable rapid, efficient transmission of data from the IoT devices to data destinations via satellite communication.

Further, the disclosure operates in an unconventional manner at least by enabling the use of cellular communication towers and other distributable devices as ground stations (and/or sinks) and/or as backhaul targets for nearby ground stations and/or sinks. The satellites described in the disclosure are configured to communicate with various types of ground stations and/or sinks using various types of interfaces and/or protocols. The satellites are configured to detect compatible interfaces and/or protocols and to switch between such interfaces and/or protocols to communicate with IoT devices and ground stations and/or sinks.

Additionally, the disclosure enables private data networks to make use of the described satellites with private IoT devices and private ground stations and/or sinks using a single-hop routing table (e.g., medium access control (MAC) address routing) that ensures that data packets from private IoT devices are only routed to private ground stations and/or sinks with which they are associated.

The E2E latency between IoT devices and destinations (e.g., the ultimate repository for the packets) includes the time required for a packet to reach a central cloud system destination via a satellite and ground station or sink. The satellites described herein are low-cost and not configured to perform any inter-satellite link (ISL) data communications. These satellites must travel long distances before forwarding data packets to a ground station that is often very far from the IoT devices from which the data packets were received. The disclosure enables the use of large quantities ground stations and sinks distributed across many different regions, thus reducing travel time between a satellite receiving a packet from an IoT device and forwarding the packet to a ground station or sink.

The present disclosure describes a concept of distributed ground stations leveraging existing cellular communication (cell) towers. Cell towers are used both as ground stations and/or sinks for satellite downlink (e.g., using Narrow Band Internet of Things (NB-IoT) network interfaces) and as backhaul for other downlink network interfaces (e.g., Long Range (LoRa) interfaces). The disclosure further describes a concept of low-cost privately owned ground stations which receive data only from corresponding IoT modems owned by the same individual and/or entity. In this case, as IoT modems and ground stations are placed at a closer satellite distance (rather than polar regions), the latency is reduced to a level of seconds.

Figure 1A:
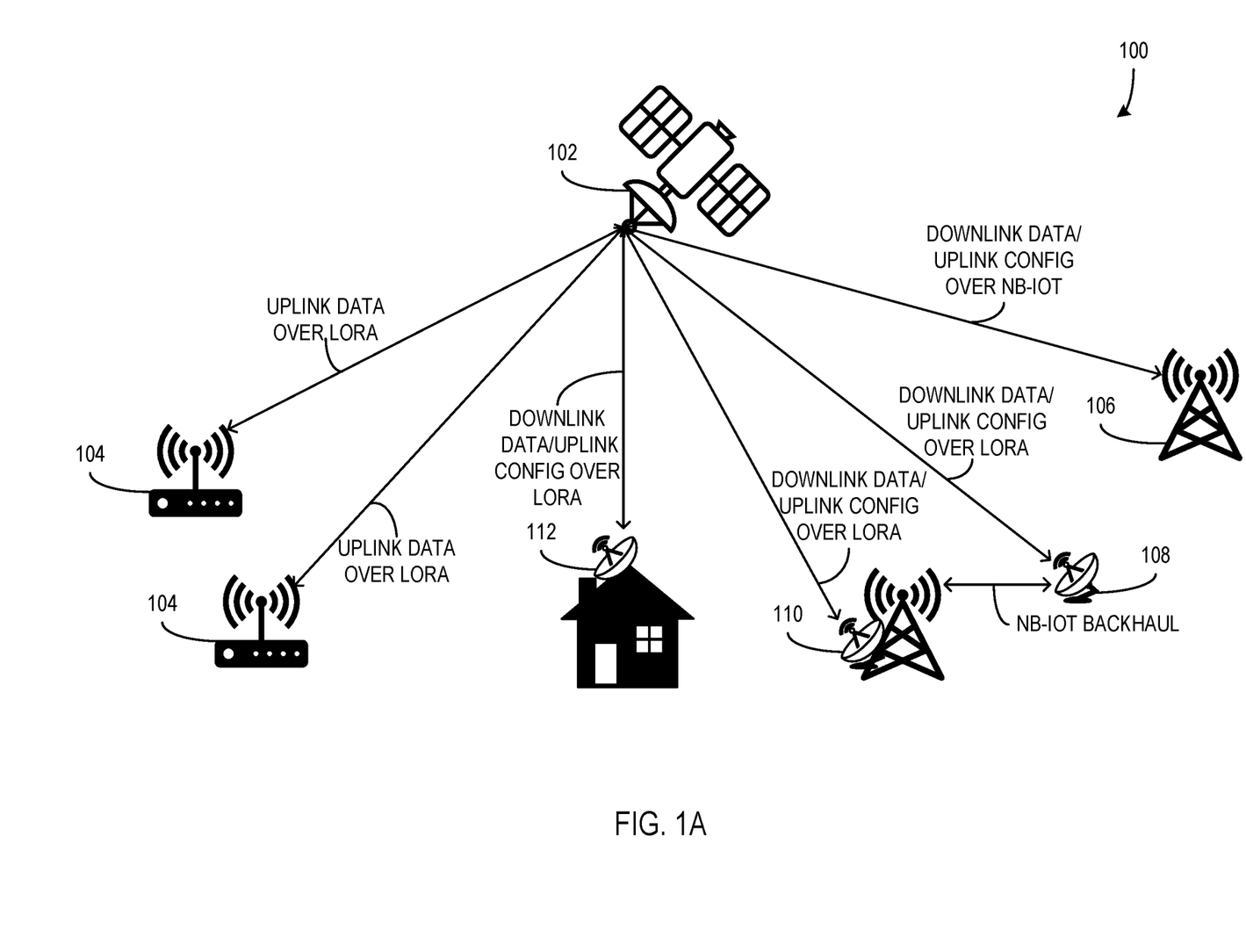
FIG. 1A is a block diagram illustrating a system configured to enable data from IoT modem-equipped devices to communicate data to satellites while they are in range.

FIG. 1A is a block diagram illustrating a system 100 configured to enable data from IoT modem-equipped devices 104 to communicate data to satellites 102 while they are in range. The satellites 102 are configured to receive the data from the IoT devices 104 and to route the received data to ground sinks and/or ground stations (e.g., ground sinks and/or stations 106-112) located elsewhere. Then, in some examples, the data is routed from the receiving ground sinks and/or stations to destinations via the Internet or other network(s).

Figure 7:
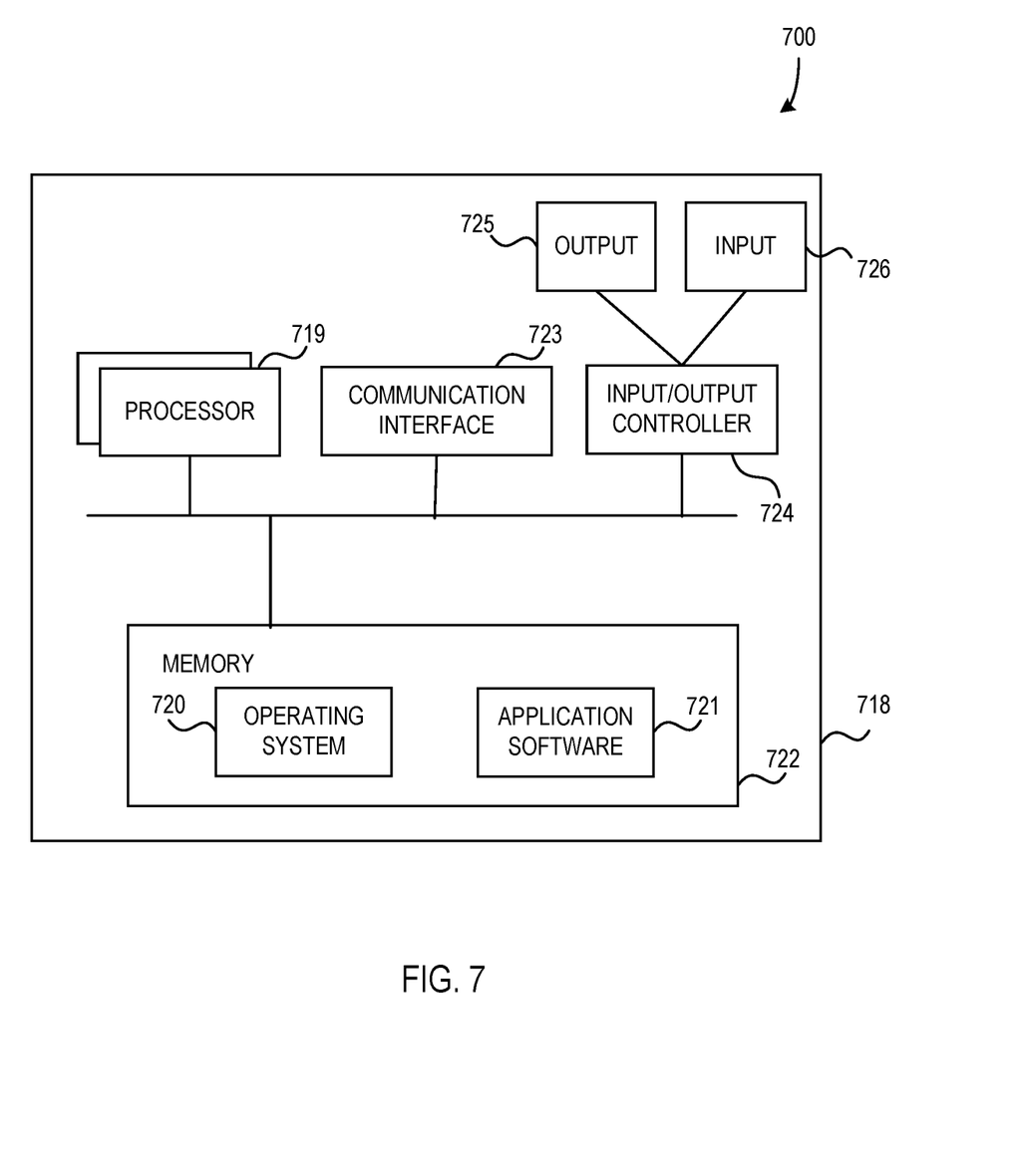
FIG. 7 illustrates an example computing apparatus as a functional block diagram.

In some examples, the satellites 102 of the system 100 include computing devices (e.g., a computing device as illustrated in FIG. 7). The satellites 102 include hardware, firmware, and/or software configured to enable the satellite to send and receive data using multiple types of communication interfaces and/or protocols. Further, the satellites 102 are configured to select and interact with ground sinks and/or stations as described herein. The operations of the satellites 102 are described in greater detail below with respect to FIG. 2.

The system 100 is configured to reduce E2E latency of the transmission of data from the IoT devices 104 to the destinations. To do so, the ground sinks and stations 106-112 used are distributed across many locations and they are designed to be low-cost devices. Further, some of the ground stations and sinks are part of private networks of IoT devices (e.g., ground station 112), such that data from those IoT devices 104 is only routed to the member ground stations and/or sinks as described herein. The constellation of satellites 102 of the system 100 is configured to provide wide coverage across the Earth at nearly all times. The distribution of the described ground stations and ground sinks is configured in such a way as to provide that constellation of satellites 102 with a wide variety of downlink targets as they orbit the globe, and to increase the frequency with which each satellite is able to send IoT device data packets to ground stations and/or sinks via downlink communications.

In some examples, the satellites 102 of the system 100 are cube satellites or nanosatellites with LoRa gateway radio communication interfaces (e.g., capable of operating in Very High Frequency (VHF), Ultrahigh Frequency (UHF), and/or Industrial, Scientific, and Medical (ISM) frequency bands) for data communication and configuration and NB-IoT UE radio communication interfaces for configuration. In other examples, other specific communication interfaces and/or protocols are used without departing from the description. Further, in some examples, the satellites 102 are configured to include other equipment, such as a camera that captures images of the earth's surface, other sensors, or the like. The satellites are configured to operate in Low Earth Orbit (LEO). Additionally, or alternatively, due to the small size and low cost of the satellites 102, in some examples, they lack the capability to communicate with other satellites of the constellation directly.

The IoT devices 104 include IoT modems that are configured to operate as narrow-band radios for sending data directly to satellites from the ground. In some examples, the IoT modems use LoRa transceivers for modulation and demodulation, enabling the modems to operate in multiple frequency bands, including VHF, UHF, and ISM (868 and 915). Thus, the IoT modems are configured to communicate with the satellites directly using the LoRa communication interfaces.

Additionally, or alternatively, the IoT devices 104 include other computing devices and/or components (e.g., the IoT modem is connected to an external computing device via Universal Serial Bus (USB) or Universal Asynchronous Receiver Transmitter (UART)). In some examples, the IoT devices 104 further include microcontrollers, single-board computers, or the like, as well as peripheral components such as sensors that collect data at the location of the IoT device 104. For instance, an IoT device 104 includes a sensor hub associated with a variety of sensors that collects and transmits sensor data to satellites 102 of the system. Additionally, the IoT devices 104 include other components, such as Global Positioning System (GPS) modules for geo-location.

In an example, an IoT device 104 includes a transceiver SX126x or SX127x. The channel bandwidth of the IoT device 104 is 7.8 kHz to 500 kHz excluding the Doppler frequency correction between 7 kHz and 20 kHz. The operation bandwidth is 150 MHz to 960 MHz including upper-VHF, UHF, and ISM (868 and 915). The central carrier frequency includes any frequency that is a multiple of 100 kHz in the above-mentioned range.

The system includes ground stations and/or ground sinks 106-112 for receiving data from the satellites over narrow-band channels such as NB-IoT and LoRa network interfaces. Additionally, or alternatively, ground stations of the system can be further configured to send configuration data and/or other commands to the satellites via those same channels or different channels. Further, ground stations are configured to send parameter data to the satellites, which is used by the satellites to enable the satellites to determine ground sinks to target when downlinking data to those ground sinks, as described herein. In contrast, ground sinks of the system are configured to only receive data from satellites over narrow-band channels and to not send data to the satellites or otherwise perform uplink transmissions.

In some examples, the ground stations and/or ground sinks are distributed across many different locations, and they are configured to be low-cost, enabling efficient establishment of a wide and varied network of ground stations and ground sinks.

Further, in some examples, the system 100 includes ground stations and/or sinks 106 in the form of existing cellular communication towers (cell towers) that are configured to receive and/or send data to satellites using NB-IoT communication (Type 1 ground stations 106). Such ground stations and/or sinks 106 are configured to backhaul or otherwise send data to a destination using a network connection of the cell towers. Additionally, or alternatively, the system 100 includes ground stations and/or sinks that are separate devices mounted to cell towers and/or otherwise in communication with cell towers (e.g., via wireless communication such as NB-IoT communication) (Type 2 ground stations 108-112). These ground stations and/or sinks 108-112 are configured to communicate with satellites using LoRa radio communications and to backhaul or otherwise send data to a destination by communicating the data to the attached cell towers (e.g., via a fiber cable connection for ground stations and/or sinks 110) and/or the nearby cell towers (e.g., via wireless communication for ground stations and/or sinks 108).

Additionally, or alternatively, ground stations and/or sinks 106-112 are configured to communicate with satellites using different interfaces and/or protocols. Further, ground stations and/or sinks 106-112 are configured to backhaul or otherwise send received data to cell towers or other network interfaces using other interfaces and/or protocols without departing from the description. For instance, in an example, a cell tower ground station 106 is configured to communicate with the satellites using LoRa communication interfaces/protocols instead of NB-IoT interfaces/protocols. In other examples, other configurations are used without departing from the description.

Further, in some examples, the ground stations 106-112 are configured to establish bi-directional communication with the satellites from the ground. Ground stations 106-112 in the system 100 are primarily used for sending commands to satellites 102 and/or for updating configuration and firmware of the satellites 102. Further, the ground stations 106-112 are used to receive downlink data from the satellites. In such examples, the system includes significantly fewer ground stations than ground sinks, as ground stations are more expensive and/or more complex to establish and/or maintain. For instance, ground stations are sparsely deployed to avoid the presence of multiple ground stations in the same satellite footprint (e.g., see the overlapping cells illustrated in FIG. 1B) and they are deployed in polar regions to enable more frequent strong contact with satellites.

The ground sinks 106-112 of the system are used only for receiving downlink data from satellites. In some examples, ground sinks are lower cost and/or lower complexity than ground stations. In such examples, ground sinks outnumber the ground stations in the system due to this relatively lower cost. Further, in some examples, the distribution of ground sinks is based on the distribution and/or density of IoT devices in a region.

Figure 1B:
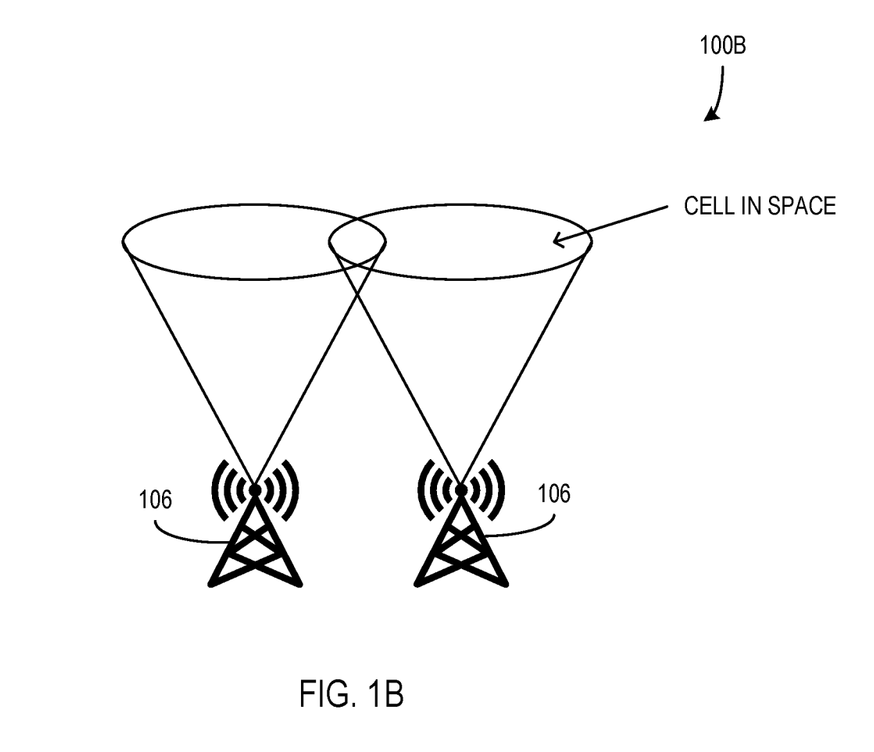
FIG. 1B is a diagram illustrating two Type 1 ground stations with overlapping cells at the altitude of satellites of the system.

In some examples, Type 1 ground stations 106, which are exiting cell towers, operate as base stations (e.g., an eNodeB) and the satellites of the system are configured to include NB-IoT User Equipment (UE) to communicate with the Type 1 ground stations and/or sinks. The Type 1 ground stations are configured to include a dedicated antenna that is capable of communication with the UE of the satellites. Both orthogonal multiple access (OMA) and non-orthogonal multiple access (NOMA) protocols can be used with the Type 1 ground stations. For instance, a ground station is configured to use OMA protocol that requires a unique cell ID for the UE of the satellites to operation, such that a unique cell area is created in the space directly above the Type 1 ground station. The area of such a cell area is dependent on the footprint of the antenna mounted on the tower (e.g., see FIG. 1B illustrating two Type 1 ground stations 106 with overlapping cells at the altitude of satellites of the system 100B).

Further, Type 1 ground sinks 106 of the system are not configured to send messages to the satellites, so using synchronous OMA of the NB-IoT protocol cannot be used with such ground sinks. Instead, satellites of the system are configured to use asynchronous NOMA to communicate with the ground sinks.

Additionally, or alternatively, in some examples, the system includes Type 2 ground stations and/or sinks 108-112, including Type 2A 108, Type 2B 110, and/or Type 2C 112 ground stations and/or sinks. Type 2 ground stations and/or sinks communicate with the satellites using LoRa interfaces and/or protocols. A Type 2A ground station 108 is a ground station that is separate from a cell tower but in wireless communication range with a cell tower for data back haul purposes. Type 2A ground stations 108 are configured to communicate with satellites using LoRa, but to send data to nearby cell towers using NB-IoT for backhaul purposes.

Type 2B ground stations and/or sinks 110 are devices that are mounted on or otherwise located very near cell towers such that the ground stations perform backhaul operations by sending data to the cell towers using fiber communication or otherwise wired communication with the cell towers.

Type 2C ground stations and/or sinks 112 are devices that are privately owned and that are configured to receive data only from associated ground IoT devices/modems 104. For instance, an entity establishes a set of ground IoT devices 104 to gather data across an area and an associated Type 2C ground station 112 to receive data from that set of devices via satellites 102 of the system 100. An Internet connection for backhaul operations is not necessary for a Type 2C ground station 112, but in some examples, some sort of network connection is used to send data to another destination that is also associated with the private entity. Type 2C ground stations and sinks 112 must be registered with the system 100 to enable the satellites 102 to be configured to accurately route data received from the private IoT devices 104 to the associated private Type 2C ground stations and/or sinks 112.

Figure 2:
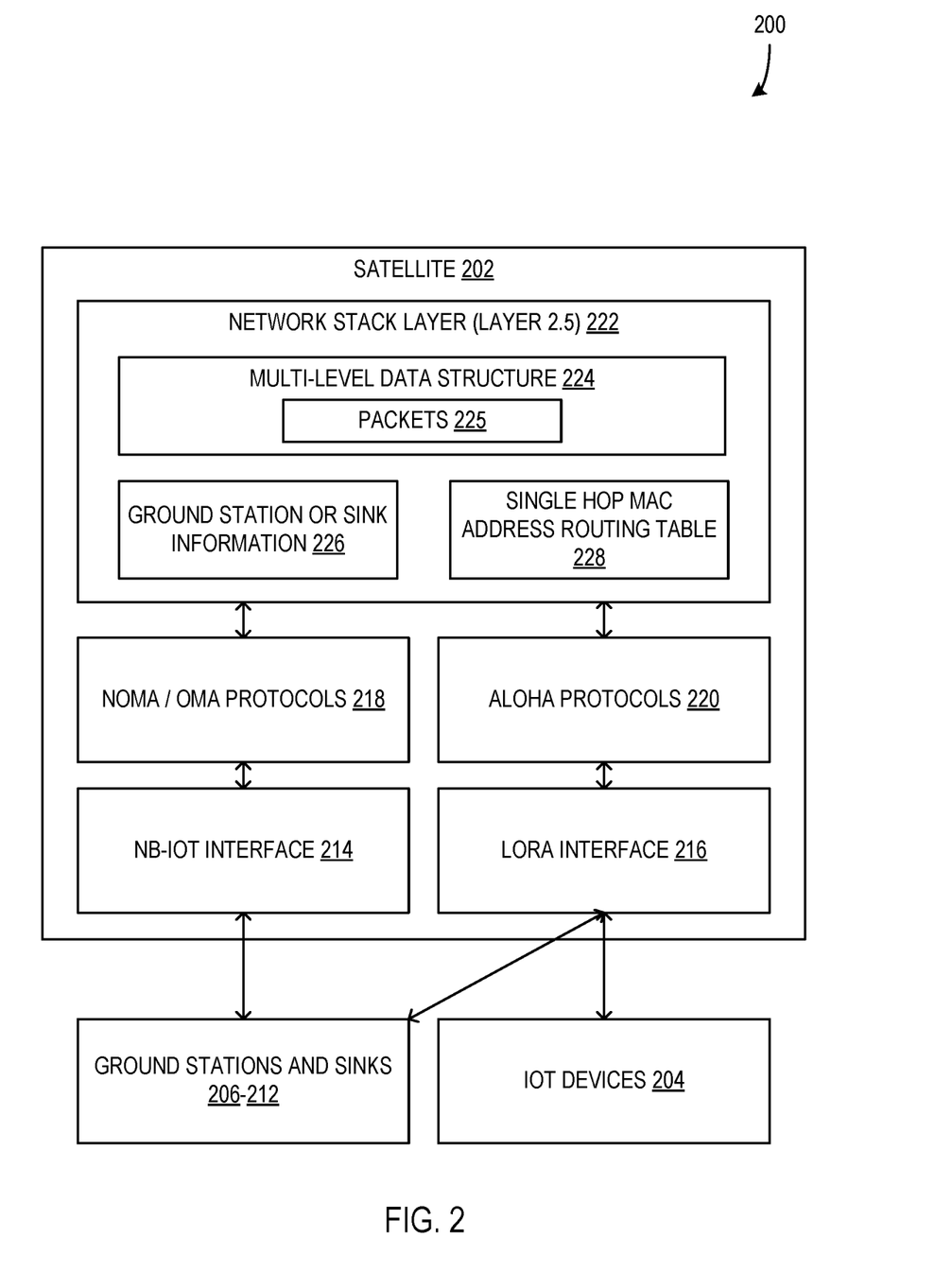
FIG. 2 is a block diagram illustrating a network stack of a satellite in an IoT device data collection system.
Figure 3:
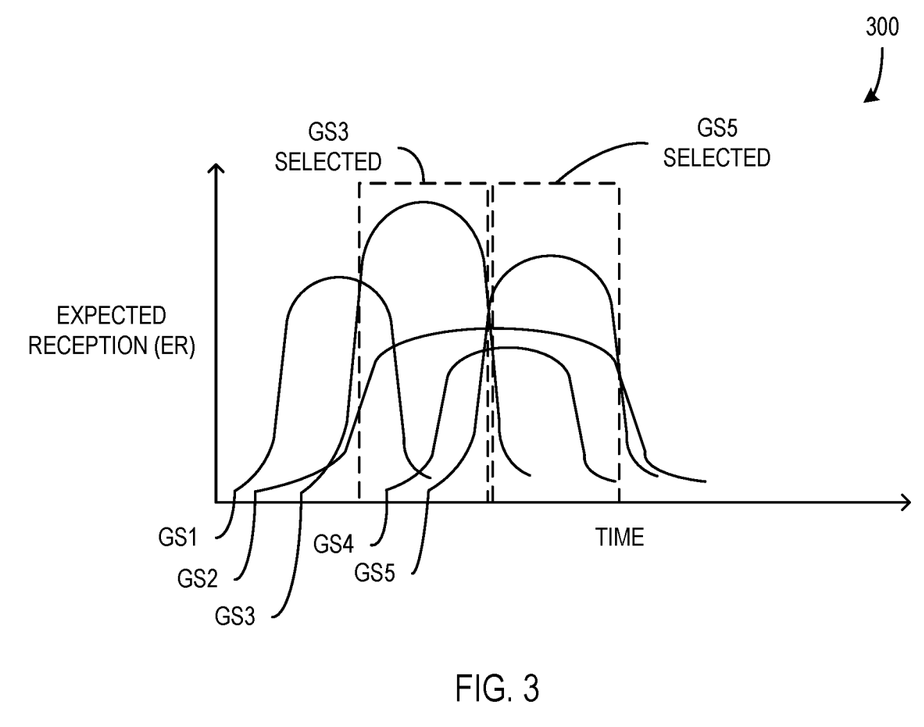
FIG. 3 is a graph illustrating relative ER scores of five different ground sinks as they change over time due to the travel of the satellite and/or changes in weather.

FIG. 2 is a block diagram illustrating a network stack 200 of a satellite 202 in an IoT device data collection system (e.g., the system of FIG. 1A). In some examples, the satellite 202 illustrated in FIG. 2 is part of a system such as system 100 of FIG. 1A described above. The satellite 202 includes a physical layer (Layer 1) of a network stack that includes an NB-IoT interface 214 and a LoRa interface 216 enabling the satellite to communicate with IoT devices 204, ground stations, and/or ground sinks 206-212 using those interfaces 214-216. In other examples, satellites 202 include more, fewer, or different interfaces in physical network layers without departing from the description.

Further, in some examples, the satellite includes a MAC layer (Layer 2) that supports NOMA/OMA protocols 218 for use with the NB-IoT communication and an ALOHA protocol 220 for use with the LoRa communication. In other examples, satellites 202 are configured to use more, fewer, and/or different protocols in MAC layers without departing from the description.

Additionally, in some examples, the satellite includes a network stack layer 222 (e.g., "Layer 2.5") that is configured to enable the satellite 202 to switch between communication interfaces and corresponding MAC protocols, to enable effective downlinking of data packets to distributed ground sinks, and to enable routing of data packets for private networks of IoT devices and ground stations.

The network stack layer 222 includes a multi-level data packet forwarding data structure 224 and is configured to manage the sending of data packets to ground stations and/or sinks 206-212 during downlink processes. The satellite 202 receives data packets 225 from IoT devices 204 and stores those packets 225 in the multi-level data structure 224 (e.g., on a first level of the data structure). The packets 225 stored in the multi-level data structure 224 are then sent to ground sinks or stations 206-212 during downlink processes as described herein. Because ground sinks do not acknowledge the reception of data packets 225 transmitted from the satellite 202, the multi-level data structure 224 is used to enable the satellite 202 to send the same data packet to multiple ground sinks, making it more likely that at least one ground sink successfully receives the data packet.

Upon sending a data packet to a ground sink from a level of the multi-level data structure 224, the satellite 202 determines whether to add the data packet 225 to the next level of the data structure 224 (e.g., the data packet 225 should be sent to at least one more ground sink) or to remove or otherwise delete the data packet 225 from the data structure entirely (e.g., the data packet 225 has been sent to enough ground sinks). To make this decision, the satellite 202 is configured to calculate an expected reception (ER) score for each of a plurality of available ground sinks 206-212, and that ER score is compared to an ER threshold. If the ER score exceeds the ER threshold, the expected reception rate of the ground sink is sufficient, such that packets 225 sent to the ground sink are not queued or otherwise added to the next level of the multi-level data structure 224. Alternatively, if the ER threshold exceeds the ER score, the expected reception rate of the ground sink is insufficient, such that the packets 225 sent to the current ground sink are queued or otherwise added to the next level of the multi-level data structure 224 for subsequent delivery of the same packets to another ground sink. This process is described in greater detail below with respect to the pseudo-code of Function 1.

Function 1

```
while true do
    SET nextContactObject TO Get_Next_GS(GS_Table);
    SET contactStartTime TO nextContactObject.Start( );
    SET contactEndTime TO nextContactObject.End( );
    INIT currentLevel TO MAX_QUEUE_LEVEL;
    Wait (contactStartTime − currentTime);
    Set_Layer_1(nextContactObject.Get_NetworkInterface( ));
    Set_Layer_2(nextContactObject.Get_MAC( ));
    while currentTime < contactEndTime do
        if currentLevel >= MIN_QUEUE_LEVEL then
            while Queue[currentLevel] !=empty do
                POP packet FROM Queue[currentLevel];
                Send_Downlink(packet);
                packet.setERscore(
                    nextContactObject.ERscore);
```

-continued

```
                if packet.ERscore < ER_THRESHOLD then
                    if currentLevel <
                        MAX_QUEUE_LEVEL then
                        PUSH packet TO Queue[currentLevel+1]
                    end
                end
            end
            DECREASE currentLevel BY 1;
        else
            BREAK;
        end
    end
end
```

In Function 1 above, the function is initialized by setting a 'nextContactObject' to a next ground sink from a GS_Table (e.g., data from the ground station or sink information 226). The 'contactStartTime' and 'contactEndTime' are determined from the nextContactObject (e.g., the satellite uses information about its current location, the location of the ground sink that is the next contact object, and/or information about how long the ground sink will be in communication range with the satellite).

Then, the satellite 202 prepares to work with the multi-level data structure 224 by setting 'currentLevel' to a 'MAX_QUEUE_LEVEL', which is the highest numbered level of the multi-level data structure 224. As described in the function, the satellite 202 is configured to process packets 225 from the top level of the multi-level data structure 224 down to the bottom level.

The satellite 202 then waits until it is within range of the next contact object and configures the network layers 1 and 2 for communication with that specific ground sink (e.g., setting the satellite to communicate using NB-IoT interface with NOMA or OMA protocols or using LoRa interface with ALOHA protocols).

While the satellite 202 is within range of the next contact object (e.g., the 'while currentTime<contactEndTime' statement), the satellite 202 sends data packets 225 to the next contact object using a multi-level downlink process. If the current level of the multi-level data structure 224 is greater than the minimum level of that data structure 224, a packet 225 is 'popped' or otherwise dequeued from the multi-level data structure 224, which is a queue structure in this example. In other examples, the data structure is a different type of data structure, such as a list, without departing from the description. Popping a packet 225 from the queue includes that the packet 225 is removed from the current level of the queue and stored temporarily in association with the 'packet' variable of the function.

The packet 225 is then sent to the next contact object using the Send_Downlink function and an ER score is calculated for the packet 225 being sent to the next contact object using the setERscore function. If the ER score of the packet 225 is less than ER_THRESHOLD and the current level of the multi-level data structure 224 is less than MAX_QUEUE_LEVEL, the packet 225 is 'pushed' into the next level of the multi-level data structure 224. Pushing a packet 225 into a level of the queue data structure includes moving and/or storing the packet in association with that level of the data structure. The process loops at the current queue level until all packets have been popped or otherwise dequeued from the queue at the current level, sent to the next contact object, and/or pushed or otherwise queued on the next level of the queue based on ER scores as described herein.

After the current level of the multi-level data structure has been processed, the current level is decreased by 1, such that the next lower level is then processed in the same manner. Once the process reaches the lowest level of the multi-level data structure 224, the process breaks out of the loop and ends.

The pseudo-code of Function 1 is merely exemplary, and variations are contemplated.

In some examples, the calculation of the ER score for a ground sink is assigned to each packet that is sent to the ground sink. Calculating an ER score for a ground sink is based on three factors, in some examples: weather prediction data, historical redundant reception rate of packets 225 by the ground sink (e.g., how many copies of packets 225 received by this ground sink are also received by other ground sinks), and link budget data based on the elevation angle between the satellite and the ground sink at the time of sending the packet.

Further, in some examples, satellites 202 receive some ER score calculation parameters when interacting with ground stations (e.g., weather data, historical redundant reception rate data, and static parameters of the link budget data). Satellites 202 use these received parameters in combination with location data and/or other dynamic data of the satellite 202 to calculate ER scores for ground sinks over time (e.g., using a dynamic elevation angle of the satellite to the ground sink as the satellite travels over and/or past the ground sink).

Additionally, or alternatively, in examples where there are multiple ground sinks in the footprint of the satellite 202 that satisfy the ER threshold, the satellite 202 is configured to select a ground sink to send packets 225 to by comparing ER scores of the available ground sinks. For instance, the ground sink with the highest ER score is selected over other ground sinks with lower scores. In some examples, the satellite 202 is configured to calculate ER scores of in-range ground sinks repeatedly as the satellite travels, enabling the satellite 202 to switch target ground sinks based on variations in relative ER scores over time (e.g., if the satellite 202 moves away from one ground sink and toward another ground sink, it switches targets from the first ground sink to the second ground sink when the ER score of the second ground sink exceeds the ER score of the first ground sink). For instance, in FIG. 3, a graph 300 illustrates relative ER scores of five different ground sinks as they change over time due to the travel of the satellite, changes in predicted weather, or the like. As illustrated, the satellite determines that ground station 3 (GS3) has the highest ER score for a first highlighted portion of time. Then, as the satellite moves away from GS3, it determines that ground station 5 (GS5) has the new highest ER score for a second highlighted portion of time. In some examples, such a determination causes the satellite to switch targets from GS3 to GS5.

In other examples, different factors are used to determine which ground sinks to target with downlink packets 225 without departing from the description.

Further, the custom network stack layer 222 (e.g., Layer 2.5) of the satellite 202 includes ground station or sink information 226. In some examples, the information 226 is stored in a dynamic table or other data structure that is updated with data sent from ground stations as the satellite 202 travels. The ground station or sink information 226 includes at least one of the following types of data associated with the distributed ground stations and/or sinks: MAC addresses, location data, network interface data, type data (e.g., whether the entity is a station or a sink), protocol indicators (e.g., whether the entity uses NOMA or OMA protocols), partial ER score data, receiver configuration parameters, etc. the satellite 202 is configured to use the ground station or sink information 226 to enable communication and/or interaction with the ground stations and/or sinks distributed around the globe as described herein.

Additionally, or alternatively, the network stack layer 222 (e.g., Layer 2.5) of the satellite 202 includes a single-hop MAC address routing table 228. The routing table 228 is configured to include routing information for any registered private networks of IoT devices and ground stations and/or sinks (e.g., Type 2C ground stations and/or sinks). In some examples, the routing table 228 is updated based on data received from ground stations (e.g., if a new private network of devices is registered, the routing table is updated to include MAC address routing data associated with the new private network when it is received from a ground station). The satellite 202 uses the routing table 228 to perform MAC address routing only to forward data packets from private IoT devices to private ground stations. In some examples, the routing table 228 includes pairs of MAC addresses from IoT devices to associated ground stations and/or sinks. Further, in some examples, each entry in the routing table 228 includes a priority value such that routing a data packet from an IoT device is routed to one of several associated ground stations based on the priority value (e.g., an IoT device-ground station pair with a higher priority value is selected for routing a data packet before an IoT device-ground station pair with a lower priority value). Routing private data packets in this way facilitates near real-time packet delivery of time sensitive data in some examples.

Figure 4:
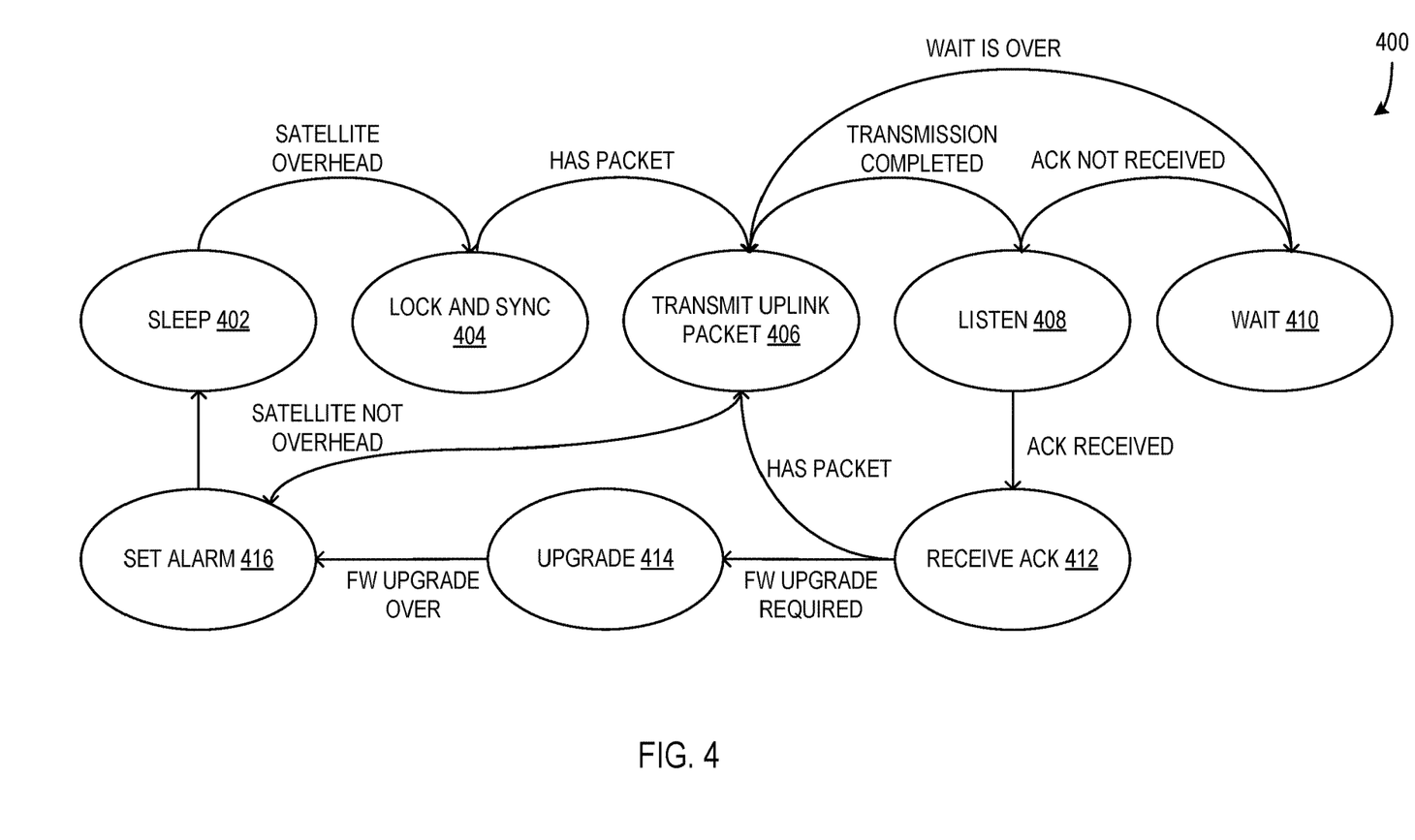
FIG. 4 is a state diagram that illustrate the operational states of an IoT modem of an IoT device for uplink communication to satellites.

FIG. 4 is a state diagram 400 that illustrate the operational states of an IoT modem of an IoT device (e.g., IoT devices 104) for uplink communication to satellites (e.g., satellite 102). The IoT modem is in a sleep state 402 until an alarm is triggered that indicates a satellite is overhead. At that point, the IoT modem transitions to a second state 404 to lock GPS and synchronize the time and location.

If the IoT modem has a packet to send to the satellite, it transitions to a transmission state 406, at which point it transmits the uplink packet to the satellite. After sending the packet, the IoT modem transitions to a state 408 during which it switches to a downlink channel and listens for an acknowledgement (e.g., an ACK) from the satellite. If an acknowledgement is received, the modem transitions to a reception state 412. Alternatively, if an acknowledgement is not received, the modem transitions to a waiting state 410 during which it waits for a random backoff time before returning to the transmission state 406 to attempt to send the packet again. In some examples, the random backoff time is modified to have an exponentially longer wait window than the previous attempt when this state is reached multiple times for a packet.

From the reception state 412, if the IoT modem has another packet to send, it returns to the transmission state 406. Alternatively, if the modem requires a firmware upgrade (e.g., upgrade data is received from the satellite with the acknowledgment), the modem transitions to a firmware upgrade mode 414. Once the upgrade is complete, the modem sets an alarm in state 416 for the next satellite round (e.g., based on satellite location and/or timing data received from satellites or other data sources). When the alarm is set, the IoT modem transitions to the sleep state 402.

Additionally, or alternatively, if the IoT modem detects or otherwise determines that the satellite is no longer overhead (e.g., the satellite is out of communication range), the IoT modem transitions to the set alarm state 416 and then to the sleep state 402 after the alarm is set. For instance, if the IoT modem is in the transmission state 406 and determines that the satellite is out of range, it transitions to the set alarm state 416 as described herein. The packets that the IoT modem was trying to transmit are preserved to be sent to another satellite that comes into range.

Figure 5:
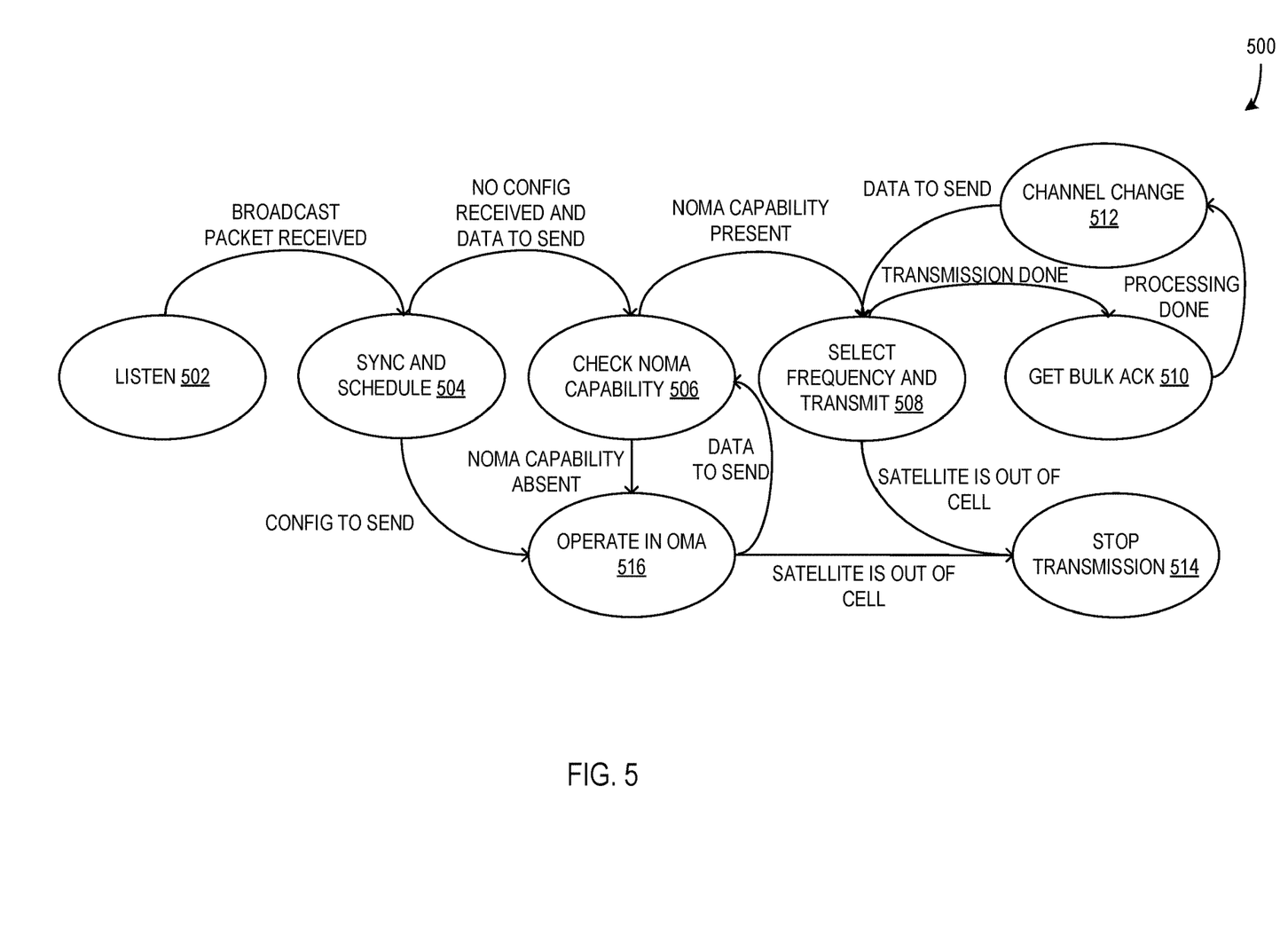
FIG. 5 is a state diagram that illustrate the operational states of a satellite for downlink communication to Type 1 ground stations.

FIG. 5 is a state diagram 500 that illustrate the operational states of a satellite (e.g., satellite 102) for downlink communication to Type 1 ground stations (e.g., a cell tower ground station 106). When the satellite enters a cell of a Type 1 ground station, it enters a listening state 502 during which it listens to the broadcast of the ground station. Upon receiving a broadcast package from the ground station, the satellite synchronizes with the ground station and obtains scheduling information from the ground station in a synchronization state 504.

If no configuration data is received from the ground station and the satellite has data to send to the ground station, it transitions to a NOMA check state 506 in which it determines whether the ground station has NOMA capability (e.g., by requesting the information from the ground station). If the ground station has NOMA capability, the satellite transitions to a NOMA configuration state 508. Alternatively, if the ground station does not have NOMA capability, the satellite transitions to an OMA protocol state 516 to send the data.

Additionally, or alternatively, if the ground station has configuration data to send when the satellite is in the synchronization state 504, the satellite transitions to the OMA protocol state 516 in order to handle the configuration data.

In the NOMA configuration state 508, the satellite selects the frequency for the data transmission and sends the data to the ground station (e.g., a bulk batch of data packets is sent). Upon completion of the transmission, the satellite transitions to an acknowledgement state 510 during which it receives a bulk ACK for the data transmission (e.g., the received bulk ACK includes acknowledgement data for multiple packets in a sent bulk batch of packets). When the bulk ACK processing is complete, the satellite transitions to a channel change state 512 during which it changes to a different channel and increases the preamble length based on a missing rate (e.g., a rate at which the ground station did not receive packets of the sent batch). Increased preamble length results in a higher probability of packet reception at the cost of lower goodput (application-level data throughput of a packet, or the quantity of non-routing data that can fit in the packet). If the missing rate of the previous transmission is high (e.g., the rate exceeds a threshold), the preamble length of packets to be sent in the future is increased to increase the probability of packet reception. If the satellite still has data to send to the ground station, it returns to the NOMA configuration state 508.

When the satellite leaves the cell of the ground station, the satellite transitions to a stop transmission state 514. The described process begins again when the satellite again enters a cell of a Type 1 ground station.

Additionally, or alternatively, during downlink communication from a satellite to a Type 1 ground sink, the ground sink is configured to support the NOMA protocol. A Type 1 ground sink does not have a cell and the downlink data can be received by multiple cell tower-based ground sinks at the same time in the footprint of the satellite. The satellite is configured to only transmit when it is overhead of such a ground sink. Additionally, or alternatively, a dwell time restriction is followed during the asynchronous NOMA transmission to enhance fair access and a reserved channel or guard-band transmission is used to avoid interference for terrestrial users.

Further, in some examples, during downlink communications from satellites to Type 2 ground stations and/or sinks, the communication is ALOHA based. The satellite initiates communication and the communication with ground stations is ACK-based, whereas it is downlink stream only with ground sinks.

Figure 6:
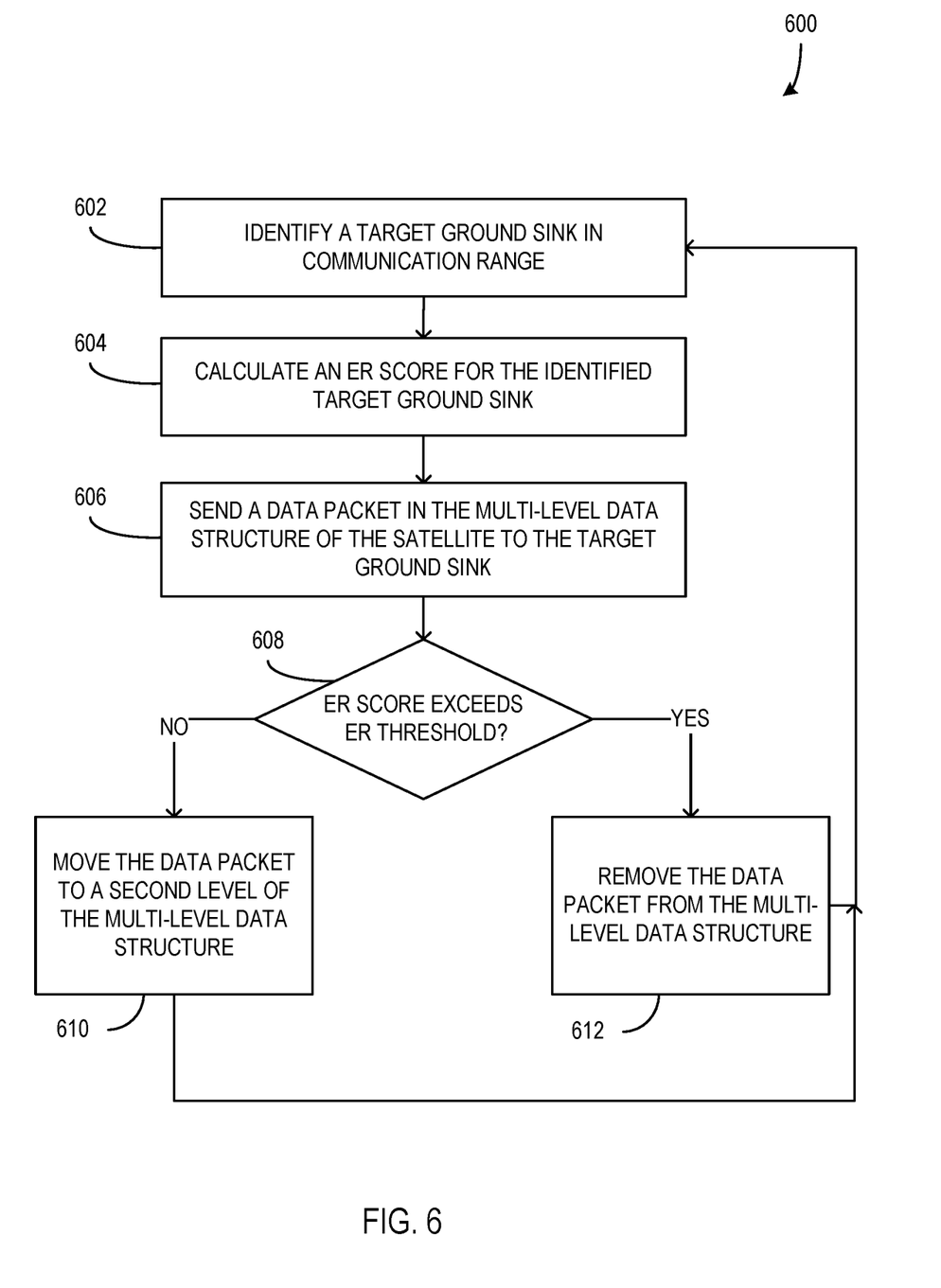
FIG. 6 is a flowchart illustrating a computerized method for sending data packets from a satellite to a ground sink using a multi-level packet data structure.

FIG. 6 is a flowchart illustrating a computerized method 600 for sending data packets from a satellite to a ground sink using a multi-level packet data structure. In some examples, the method 600 is executed or otherwise performed by a satellite such as satellite 102 in a system such as system 100 of FIG. 1A. At 602, the satellite identifies a target ground sink in communication range.

At 604, the satellite calculates an ER score for the identified target ground sink based on ER parameter data and location data of the satellite. In some examples, the ER parameter data includes weather data, historical redundant reception rate data, and link budget data based on an elevation angle of the ground sink with respect to the location data of the satellite.

At 606, the satellite sends a data packet from a multi-level data structure (e.g., multi-level data packet forwarding data structure 224) of the satellite to the target ground sink.

If, at 608, the ER score of the ground sink exceeds a defined ER threshold, the process proceeds to 612. Alternatively, if the ER score of the ground sink does not exceed the defined ER threshold, the process proceeds to 610.

At 610, the data packet is moved to a second level of the multi-level data structure and the process proceeds to 602 to identify the next target ground sink. In such examples, the data packet that is now stored in the second level of the multi-level data structure will be sent again to the next target ground sink or another target ground sink.

At 612, the data packet is removed from the multi-level data structure and the process proceeds to 602 to identify the next target ground sink. Because the data packet is removed from the multi-level data structure, it is not sent to another target ground sink.

It should be understood that the ER score of the ground sink is an indicator of a likelihood that the sent data packet will be successfully received by the ground sink. A higher ER score indicates a higher likelihood, and a lower ER score indicates a lower likelihood. In examples where a data packet is sent to several ground sinks with ER scores that are lower than the ER threshold, the data packet can be sent to a quantity of ground sinks up to the quantity of levels in the multi-level data structure.

Further, in some examples, the method includes identifying a second ground sink in communication range of the satellite. An ER score is calculated for the second ground sink based on ER parameter data and location data of the satellite. A second data packet in the multi-level data structure is sent to the second ground sink and, based on the calculated ER score exceeding the ER threshold, the second data packet is removed from the multi-level data structure.

In some examples, identifying the target ground sink includes identifying a plurality of ground sinks in communication range of the satellite. ER scores are calculated for each of the plurality of ground sinks based on the ER parameter data and the location data of the satellite. A target ground sink is then selected from the plurality of ground sinks based on a calculated ER score for the selected target ground sink exceeding ER scores of the other ground sinks of the plurality of ground sinks. Further, the ER scores of the plurality of ground sinks are recalculated periodically and a target ground sink is reselected periodically based on the recalculated ER scores.

Further, in some examples, the method 600 further includes receiving a second data packet from an IoT device associated with a private network. A private network ground sink associated with the private network is then identified based on a single-hop MAC address routing table of the satellite and the received second data packet is sent to the identified private network ground sink upon the satellite moving into range of the identified private network ground sink.

Additionally, or alternatively, the method includes determining an identifier of the identified target ground sink. A network interface type of the target ground sink is then determined based on the determined identifier and a ground sink information table stored in the satellite. The data packet is sent to the target ground sink using communications compatible with the determined network interface type.

Exemplary Operating Environment

The present disclosure is operable with a computing apparatus according to an embodiment as a functional block diagram 700 in FIG. 7. In an example, components of a computing apparatus 718 are implemented as a part of an electronic device according to one or more embodiments described in this specification. The computing apparatus 718 comprises one or more processors 719 which may be microprocessors, controllers, or any other suitable type of processors for processing computer executable instructions to control the operation of the electronic device. Alternatively, or in addition, the processor 719 is any technology capable of executing logic or instructions, such as a hard-coded machine. In some examples, platform software comprising an operating system 720 or any other suitable platform software is provided on the apparatus 718 to enable application software 721 to be executed on the device. In some examples, enabling data forwarding between IoT devices and ground stations via satellites as described herein is accomplished by software, hardware, and/or firmware.

In some examples, computer executable instructions are provided using any computer-readable media that are accessible by the computing apparatus 718. Computer-readable media include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media.

Although the computer storage medium (the memory 722) is shown within the computing apparatus 718, it will be appreciated by a person skilled in the art, that, in some examples, the storage is distributed or located remotely and accessed via a network or other communication link (e.g., using a communication interface 723).

Further, in some examples, the computing apparatus 718 comprises an input/output controller 724 configured to output information to one or more output devices 725, for example a display or a speaker, which are separate from or integral to the electronic device. Additionally, or alternatively, the input/output controller 724 is configured to receive and process an input from one or more input devices 726, for example, a keyboard, a microphone, or a touchpad. In one example, the output device 725 also acts as the input device. An example of such a device is a touch sensitive display. The input/output controller 724 may also output data to devices other than the output device, e.g., a locally connected printing device. In some examples, a user provides input to the input device(s) 726 and/or receive output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises at least one processor of a satellite; and at least one memory of the satellite comprising computer program code, the at least one memory and the computer program code configured to, with the at least one processor, cause the at least one processor to: identify a target ground sink in communication range of the satellite; calculate an expected reception (ER) score for the identified target ground sink based on ER parameter data and location data of the satellite; send a data packet in a first level of a multi-level data structure of the satellite to the identified target ground sink; and based on an ER threshold exceeding the calculated ER score, move the data packet to a second level of the multi-level data structure, whereby the data packet is queued to be sent subsequently to a second ground sink.

An example computerized method comprises identifying, by a processor, a target ground sink in communication range of the satellite; calculating, by the processor, an expected reception (ER) score for the identified target ground sink based on ER parameter data and location data of the satellite; sending, by the processor, a data packet in a first level of a multi-level data structure of the satellite to the identified target ground sink; and based on an ER threshold exceeding the calculated ER score, moving, by the processor, the data packet to a second level of the multi-level data structure, whereby the data packet is queued to be sent subsequently to a second ground sink.

One or more computer storage media having computer-executable instructions that, upon execution by a processor, cause the processor to at least: identify a target ground sink in communication range of the satellite; calculate an expected reception (ER) score for the identified target ground sink based on ER parameter data and location data of the satellite; send a data packet in a first level of a multi-level data structure of the satellite to the identified target ground sink; and based on an ER threshold exceeding the calculated ER score, move the data packet to a second level of the multi-level data structure, whereby the data packet is queued to be sent subsequently to a second ground sink.

Alternatively, or in addition to the other examples described herein, examples include any combination of the following:

further comprising: identifying the second ground sink in communication range of the satellite; calculating an ER score for the identified second ground sink based on ER parameter data and location data of the satellite; sending a second data packet in the multi-level data structure of the satellite to the identified second ground sink; and based on a calculated ER score exceeding the ER threshold, removing the second data packet from the multi-level data structure.

wherein the ER parameter data includes at least one of the following: weather data, historical redundant reception rate data of packets by the identified target ground sink, and link budget data based on an elevation angle of the identified target ground sink with respect to the location data of the satellite.

wherein identifying the target ground sink includes: identifying a plurality of ground sinks in communication range of the satellite; calculate ER scores for the plurality of ground sinks based on the ER parameter data and the location data of the satellite; and selecting the target ground sink from the plurality of ground sinks based on a calculated ER score for the selected target ground sink exceeding the ER scores of the other ground sinks of the plurality of ground sinks.

wherein ER scores of the plurality of ground sinks are recalculated periodically and a target ground sink is reselected periodically based on the recalculated ER scores.

further comprising: receiving a second data packet from an IoT device associated with a private network; identifying a private network ground sink associated with the private network based on a single-hop MAC address routing table of the satellite; and sending the received second data packet to the identified private network ground sink.

wherein sending the data packet to the target ground sink includes: determining an identifier of the identified target ground sink; determining a network interface type of the target ground sink based on the determined identifier and a ground sink information table stored in the satellite; and sending the data packet to the target ground sink using communications compatible with the determined network interface type.

wherein the identified target ground sink is a cell tower configured as a ground sink.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for identifying, by a processor, a target ground sink in communication range of the satellite; exemplary means for calculating, by the processor, an expected reception (ER) score for the identified target ground sink based on ER parameter data and location data of the satellite; exemplary means for sending, by the processor, a data packet in a first level of a multi-level data structure of the satellite to the identified target ground sink; and based on an ER threshold exceeding the calculated ER score, exemplary means for moving, by the processor, the data packet to a second level of the multi-level data structure, whereby the data packet is queued to be sent subsequently to a second ground sink.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
    at least one processor of a satellite; and
    at least one memory of the satellite comprising computer program code, the at least one memory and the computer program code configured to, with the at least one processor, cause the at least one processor to:
    identify a target ground sink in communication range of the satellite;
    calculate an expected reception (ER) score for the identified target ground sink based on ER parameter data and location data of the satellite;
    send a data packet in a first level of a multi-level data structure of the satellite to the identified target ground sink; and
    based on an ER threshold exceeding the calculated ER score, transfer the data packet to a second level of the multi-level data structure, whereby the data packet is queued to be sent subsequently to a second ground sink.

2. The system of claim 1, the at least one memory and the computer program code configured to, with the at least one processor, further cause the at least one processor to:
    identify the second ground sink in communication range of the satellite;
    calculate an ER score for the identified second ground sink based on ER parameter data and location data of the satellite;
    send a second data packet in the multi-level data structure of the satellite to the identified second ground sink; and
    based on a calculated ER score exceeding the ER threshold, remove the second data packet from the multi-level data structure.

3. The system of claim 1, wherein the ER parameter data includes at least one of the following: weather data, historical redundant reception rate data of packets by the identified target ground sink, and link budget data based on an elevation angle of the identified target ground sink with respect to the location data of the satellite.

4. The system of claim 1, wherein identifying the target ground sink includes:
    identifying a plurality of ground sinks in communication range of the satellite;
    calculate ER scores for the plurality of ground sinks based on the ER parameter data and the location data of the satellite; and
    selecting the target ground sink from the plurality of ground sinks based on a calculated ER score for the selected target ground sink exceeding the ER scores of the other ground sinks of the plurality of ground sinks.

5. The system of claim 4, wherein ER scores of the plurality of ground sinks are recalculated periodically and a target ground sink is reselected periodically based on the recalculated ER scores.

6. The system of claim 1, the at least one memory and the computer program code configured to, with the at least one processor, further cause the at least one processor to:
    receive a second data packet from an IoT device associated with a private network;
    identify a private network ground sink associated with the private network based on a single-hop MAC address routing table of the satellite; and
    send the received second data packet to the identified private network ground sink.

7. The system of claim 1, wherein sending the data packet to the target ground sink includes:
    determining an identifier of the identified target ground sink;
    determining a network interface type of the target ground sink based on the determined identifier and a ground sink information table stored in the satellite; and
    sending the data packet to the target ground sink using communications compatible with the determined network interface type.

8. The system of claim 1, wherein the identified target ground sink is a cell tower configured as a ground sink.

9. A computerized method comprising:
  identifying, by a processor of a satellite, a target ground sink in communication range of the satellite;
  calculating, by the processor, an expected reception (ER) score for the identified target ground sink based on ER parameter data and location data of the satellite;
  sending, by the processor, a data packet in a first level of a multi-level data structure of the satellite to the identified target ground sink; and
  based on an ER threshold exceeding the calculated ER score, moving, by the processor, the data packet to a second level of the multi-level data structure, whereby the data packet is queued to be sent subsequently to a second ground sink.

10. The computerized method of claim 9, further comprising:
  identifying the second ground sink in communication range of the satellite;
  calculating an ER score for the identified second ground sink based on ER parameter data and location data of the satellite;
  sending a second data packet in the multi-level data structure of the satellite to the identified second ground sink; and
  based on a calculated ER score exceeding the ER threshold, removing the second data packet from the multi-level data structure.

11. The computerized method of claim 9, wherein the ER parameter data includes at least one of the following: weather data, historical redundant reception rate data of packets by the identified target ground sink, and link budget data based on an elevation angle of the identified target ground sink with respect to the location data of the satellite.

12. The computerized method of claim 9, wherein identifying the target ground sink includes:
  identifying a plurality of ground sinks in communication range of the satellite;
  calculate ER scores for the plurality of ground sinks based on the ER parameter data and the location data of the satellite; and
  selecting the target ground sink from the plurality of ground sinks based on a calculated ER score for the selected target ground sink exceeding the ER scores of the other ground sinks of the plurality of ground sinks.

13. The computerized method of claim 12, wherein ER scores of the plurality of ground sinks are recalculated periodically and a target ground sink is reselected periodically based on the recalculated ER scores.

14. The computerized method of claim 9, further comprising:
  receiving a second data packet from an IoT device associated with a private network;
  identifying a private network ground sink associated with the private network based on a single-hop MAC address routing table of the satellite; and
  sending the received second data packet to the identified private network ground sink.

15. The computerized method of claim 9, wherein sending the data packet to the target ground sink includes:
  determining an identifier of the identified target ground sink;
  determining a network interface type of the target ground sink based on the determined identifier and a ground sink information table stored in the satellite; and
  sending the data packet to the target ground sink using communications compatible with the determined network interface type.

16. One or more computer storage media having computer-executable instructions that, upon execution by a processor, cause the processor to at least:
  identify a target ground sink in communication range of a satellite;
  calculate an expected reception (ER) score for the identified target ground sink based on ER parameter data and location data of the satellite;
  send a data packet in a first level of a multi-level data structure of the satellite to the identified target ground sink; and
  based on an ER threshold exceeding the calculated ER score, transfer the data packet to a second level of the multi-level data structure, whereby the data packet is queued to be sent subsequently to a second ground sink.

17. The one or more computer storage media of claim 16, wherein the computer-executable instructions, upon execution by a processor, further cause the processor to:
  identify the second ground sink in communication range of the satellite;
  calculate an ER score for the identified second ground sink based on ER parameter data and location data of the satellite;
  send a second data packet in the multi-level data structure of the satellite to the identified second ground sink; and
  based on a calculated ER score exceeding the ER threshold, remove the second data packet from the multi-level data structure.

18. The one or more computer storage media of claim 16, wherein the ER parameter data includes at least one of the following: weather data, historical redundant reception rate data of packets by the identified target ground sink, and link budget data based on an elevation angle of the identified target ground sink with respect to the location data of the satellite.

19. The one or more computer storage media of claim 16, wherein identifying the target ground sink includes:
  identifying a plurality of ground sinks in communication range of the satellite;
  calculate ER scores for the plurality of ground sinks based on the ER parameter data and the location data of the satellite; and
  selecting the target ground sink from the plurality of ground sinks based on a calculated ER score for the selected target ground sink exceeding the ER scores of the other ground sinks of the plurality of ground sinks.

20. The one or more computer storage media of claim 16, wherein the computer-executable instructions, upon execution by a processor, further cause the processor to:
  receive a second data packet from an IoT device associated with a private network;
  identify a private network ground sink associated with the private network based on a single-hop MAC address routing table of the satellite; and
  send the received second data packet to the identified private network ground sink.

* * * * *